US012559601B2

(12) United States Patent
Schroder et al.

(10) Patent No.: US 12,559,601 B2
(45) Date of Patent: *Feb. 24, 2026

(54) METHOD FOR CURING THERMOSETTING POLYMERS

(71) Applicant: PulseForge Inc., Austin, TX (US)

(72) Inventors: Kurt A. Schroder, Coupland, TX (US); Vahid Akhavan Attar, Austin, TX (US); Vikram Shreeshail Turkani, Austin (IN)

(73) Assignee: Pulse Forge, Inc., Austin, TX (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/199,942

(22) Filed: May 20, 2023

(65) Prior Publication Data

US 2024/0384049 A1      Nov. 21, 2024

(51) Int. Cl.
*C08J 7/18* (2006.01)
*C08J 7/04* (2020.01)

(52) U.S. Cl.
CPC .............. *C08J 7/18* (2013.01); *C08J 7/0427* (2020.01); *C08J 2367/02* (2013.01); *C08J 2379/08* (2013.01)

(58) Field of Classification Search
None
See application file for complete search history.

(56) References Cited

U.S. PATENT DOCUMENTS

| | | | | |
|---|---|---|---|---|
| 4,081,572 A | * | 3/1978 | Pacansky | C08G 69/26 |
| | | | | 528/363 |
| 5,288,526 A | * | 2/1994 | Hogan | B05D 3/067 |
| | | | | 427/508 |
| 5,453,161 A | * | 9/1995 | DeMeuse | C08J 3/28 |
| | | | | 204/157.81 |
| 2004/0125188 A1 | * | 7/2004 | Szumla | B41C 1/1066 |
| | | | | 347/103 |
| 2010/0007285 A1 | * | 1/2010 | Schroder | B05D 3/06 |
| | | | | 315/241 P |

* cited by examiner

*Primary Examiner* — Jose I Hernandez-Kenney
(74) *Attorney, Agent, or Firm* — Stinson LLP

(57) ABSTRACT

A method for curing thermosetting polymers is disclosed. A thermosetting polymer precursor is deposited on a substrate. After the thermosetting polymer precursor has been pre-heated, the thermosetting polymer precursor is then exposed to a light pulse from a flashlamp while it is being cooled simultaneously in order to maintain an average temperature of the thermosetting polymer precursor at below its maximum working temperature. After the thermosetting polymer precursor has been exposed to the light pulse, a by-product is allowed to dissipate from the thermosetting polymer precursor. The light pulse exposure step and the by-product dissipation step are repeated multiple times until a thermosetting polymer thin film is formed.

16 Claims, 5 Drawing Sheets light pulse
from flashlamp light pulse
from flashlamp pulsed light
from flashlamp light pulse
from flashlamp Direction of movement

METHOD FOR CURING THERMOSETTING POLYMERS

TECHNICAL FIELD

The present application relates to thermosetting polymers in general, and, in particular, to a method for curing thermosetting polymers.

BACKGROUND

Many functional materials can yield better performances after higher temperature processing; thus, it is more desirable to process thin film materials at higher temperatures. However, higher temperature processing generally requires higher temperature-rated substrates, and that almost always means more expensive substrates are required. For example, polyimide (PI) is a high-temperature polymer that is considered as superior over polyethylene terephthalate (PET)— the dominant low-temperature substrate material for printed electronics. But the curing of PI requires a higher temperature thermal processing for a longer period of time, which brings up three reasons that prevent PI from being widely adopted in more applications. First, maintaining the PI precursor at a high temperature for a long time is energy intensive, which will increase the cost of the final product. Second, the temperature and time for PI curing are beyond those which most polymers can withstand without being damaged, which means PI cannot be formed adjacent to many other polymers. Third, since the curing of PI generates a small amount of water, in the form of vapor, thick layers are essentially impossible. In other words, PI must be formed in thin films.

Hence, even though PI is a very desirable material for the printed electronics industry due to its high temperature stability and chemical resistance; however, the adoption of PI is rare, largely because the curing of PI must be done at a high temperature for an extended period of time.

Consequently, it would be desirable to provide an improved method for forming PI quickly, in thick layers, with little input energy, on low-temperature substrates.

SUMMARY OF THE INVENTION

In accordance with one embodiment, a thermosetting polymer precursor is deposited on a substrate. After the thermosetting polymer precursor has been preheated, the thermosetting polymer precursor is then exposed to a light pulse from a flashlamp while it is being cooled simultaneously in order to maintain an average temperature of the thermosetting polymer precursor at below its maximum working temperature. After the thermosetting polymer precursor has been exposed to the light pulse, a gaseous by-product is allowed to dissipate from the thermosetting polymer precursor. The light pulse exposure step and the by-product dissipation step are repeated multiple times until a thermosetting polymer thin film is formed.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The prior art method for curing a polyimide (PI) precursor to form a thin film PI is as follows. Initially, a PI precursor is deposited onto a substrate in liquid form. After placing the substrate in an oven to remove the liquid (or solvent) from the PI precursor at a high temperature, the PI precursor is then cured. For this prior art curing method, the temperature of the PI precursor is generally maintained at around 350° C. for about two hours in order to completely crosslink (imidize) the PI precursor. A lower temperature would cure the PI much slower, while a higher temperature can cure it faster. But if the temperature is too high and the crosslinking happens too quickly, the water vapor (or other volatiles) generated from the reaction cannot be released from the interior of the thin film without damaging it.

Figure 1:
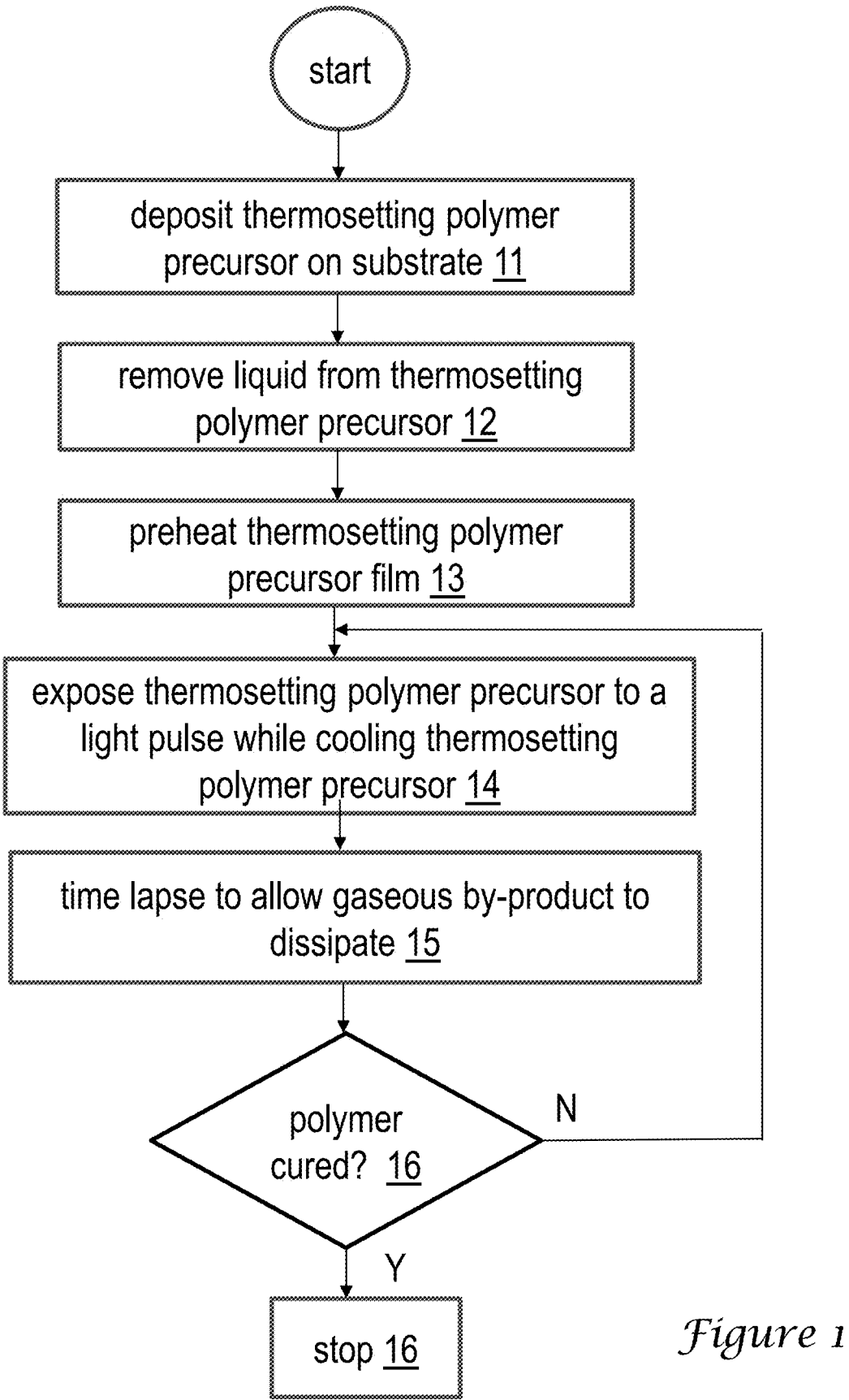
FIG. 1 illustrates a method for curing thermosetting polymers, according to one embodiment.

Referring now to the drawings and in particular to FIG. 1, there is depicted a method for curing thermosetting polymers, according to one embodiment. Examples of thermosetting polymers include polyimides, epoxies, silicones, and acrylics.

Deposition

According to one embodiment of the present invention, a thermosetting polymer precursor is deposited on a substrate, as shown in block 11. Examples of thermosetting polymer precursor include polyamic acid and epoxy. The thermosetting polymer precursor can be deposited in liquid or solid form to about 1-100 microns thick. The thermosetting polymer precursor can be deposited on the substrate via a variety of full coat techniques including spin coat, doctor blade, roll coating, spray coating, etc. The thermosetting polymer precursor may also be selectively deposited on the substrate via inkjet, flexographic, gravure, syringe dispense, screen print, stencil print, etc. The substrate can be metal, glass, ceramic, semiconductor, or polymer. Instead of a single substrate, the thermosetting polymer precursor can also be deposited on a stack having multiple layers.

Drying

If the thermosetting polymer precursor (such as polyamic acid-precursor for PI) is deposited in liquid form, the thermosetting polymer precursor is dried to remove the solvent from the thermosetting polymer precursor, as depicted in block 12. The drying may be performed by placing the thermosetting polymer precursor and the substrate in an oven. The environment may be inert to prevent the thermosetting polymer precursor from oxidizing. The thermosetting polymer precursor can also be dried using a near-infrared lamp. The thermosetting polymer precursor may also be dried using multiple light pulses from a flashlamp. When using the flashlamp approach for drying, an inert atmosphere is not necessary, and the peak temperature during each light pulse may be above the boiling point of the lowest boiling point solvent within the thermosetting polymer precursor, but the average temperature during the processing time may be below the boiling point of the lowest boiling point solvent in the thermosetting polymer precursor.

During the drying process, the thermosetting polymer precursor may be cooled by convection, such as by an air knife, or/and by conduction, such as a relatively thermally massive or/and actively temperature-controlled block that is in contact with the thermosetting polymer precursor directly or via its substrate or stack. When drying, both the peak and average temperature that can be reached without damaging the thermosetting polymer precursor is generally less than the peak and average curing temperature for the thermoset as the solvents in the thermosetting polymer precursor boil at a temperature below the maximum rated temperature of the thermosetting polymer precursor or fully cured thermoset. Some thermosetting polymer precursor, such as epoxy, do not need to be dried.

Preheating

After drying (if necessary) and prior to curing, the thermosetting polymer precursor is preheated, as shown in block 13. The preheating can be performed by using a variety of methods, including hot air, near-infrared lamps, infrared lamps, conduction from an underlying chuck, rollers, or a flashlamp.

Curing

Instead of using an oven for curing, a set of light pulses in conjunction with active cooling are then utilized to modulate the temperature of the thermosetting polymer precursor during curing. Initially, the thermosetting polymer precursor is exposed to a light pulse from a flashlamp while the thermosetting polymer precursor is being cooled at the same time in order to keep the average temperature of the thermosetting polymer precursor at below its maximum working temperature, as depicted in block 14. The thermosetting polymer precursor is heated by the light pulse to beyond its maximum steady-state working temperature, thereby increasing the cure (e.g., crosslinking) rate. At the same time, the thermosetting polymer precursor is also being cooled to below its maximum working temperature.

After the application of the light pulse, a predetermined amount of time is allowed to lapse in order to let any gaseous or volatile by-products to dissipate from the thermosetting polymer precursor, as shown in block 15.

A determination is made as to whether or not the thermosetting polymer precursor has been cured, as depicted in block 16. If the thermosetting polymer precursor has not been cured, the light pulse exposure step in block 14 and the by-product dissipation step in block 15 are repeated. If the thermosetting polymer precursor has been cured (i.e., a thermosetting polymer thin film is formed), the process is completed, as depicted in block 16 in FIG. 1.

Each time the thermosetting polymer precursor is exposed to a light pulse, the thermosetting polymer precursor is heated to a temperature that is higher than the thermosetting polymer precursor's maximum operating temperature. In the case of forming polyimide, this temperature is about 350° C. at the beginning of the cure and is about 400° C. when the thermoset precursor is fully imidized. At the peak of a light pulse, the temperature that can be reached in the thermosetting polymer precursor film is briefly (~millisecond) higher (~200° C. higher) than the steady-state maximum allowed temperature. During processing, the thermosetting polymer precursor is also being cooled such that the average temperature of the surface of the thermosetting polymer precursor is lower than the steady-state maximum rate temperature of the thermosetting polymer material. The cooling is applied continuously and occurs during (1 millisecond) and between the light pulses (~tens to hundreds of milliseconds). This light exposure/cooling is repeated multiple times until the thermosetting polymer precursor is completely crosslinked. The total processing time is approximately 5 seconds to 1 minute.

Purpose of Cooling During Curing

In all cases, the total energy deposited into the thermosetting polymer precursor by the light pulse train is much greater than that required to thermally damage the thermosetting polymer precursor. Thus, in all cases, heat needs to be removed from the thermosetting polymer precursor, either by conduction or convection during processing in order to prevent the average temperature of the thermosetting polymer precursor from exceeding its maximum rated equilibrium temperature.

In addition, the by-product of the crosslinking process is typically of a lower boiling point than the cured polymer, and if left within the thermosetting polymer precursor at a high concentration would lead to bubbling and/or burning with subsequent light pulses. The cooling is necessary to maintain a suitable working temperature to remove the by-product but provide suitable access to the peak temperature necessary for further curing of the thermosetting polymer precursor. There is also a cooling effect due to the release of gas from the crosslinking process. The thermosetting polymer precursor may be cooled by conduction, convection, or both.

Cooling by Conduction

The thermosetting polymer precursor may be in physical contact with a heat sink during exposure by the flashlamp. The heat sink can be a thermally massive chuck or roller made from metal, ceramic, graphite, glass, etc. The heat sink can be a substrate to which the thermosetting polymer precursor has been applied, providing the substrate is thick enough. Alternatively, the thermosetting polymer precursor can be located on a thin substrate that is in physical contact with a thermally massive heat sink mentioned above. In other words, the thermosetting polymer precursor is in physical contact with a large thermal mass. The areal density of the thermal mass is preferably 50-500 times greater than the areal density of the thermoset precursor film. In other words, the thermal mass, which may include the substrate, the chuck or roller, and any layers in between them are (50-500 times) thicker than the thermosetting polymer precursor's thickness. The chuck or roller may also be temperature controlled.

Cooling by Convection

The thermosetting polymer precursor may be cooled via convection by using, for example, an air knife. Aside from providing cooling, an air knife has the added benefit of removing any gaseous by-products from the drying or curing process. An air knife may also be utilized in addition to conductive cooling mentioned above.

Flashlamp Emission Absorption

The emission spectrum from the above-mentioned flashlamp is broadband and ranges from 200 nm to 1,500 nm. In order to heat the thermosetting polymer precursor, some of the emission bands from the flashlamp must be absorbed. Absorption may be performed by the thermosetting polymer precursor directly, any of the layers of a composite substrate, a chuck or rollers, or a combination thereof. Preferably, the absorption should be performed by the thermosetting polymer precursor or the substrate adjacent to it. In the case of forming polyimide, the precursor (polyamic acid) has a very sharp absorption transition at about 500 nm, meaning that it is very absorptive for wavelengths shorter than 500 nm, but is generally transparent at wavelengths longer than 500 nm. If the layer immediately below the thermosetting polymer precursor is absorptive of wavelengths over 500 nm, and an optical filter removing wavelengths below 500 nm is placed between the flashlamp and the polyimide precursor, then the polyimide polymer precursor can be heated readily via conduction.

Additionally, absorbers (light-absorbing materials) can be placed in the thermosetting polymer precursor to enhance its absorbance of the emissions. If it is desirable to maintain its transparency in the visible spectrum, then near-infrared absorbers may be placed in the thermosetting polymer precursor to increase its absorbance of the emissions.

In some cases, it is desirable to process the thermosetting polymer precursor without the use of ultra-violet (UV) light. A UV block filter may be placed in the beam and the curing may be performed with the visible and near infrared portions of the emissions. Absorbers may be placed in the thermosetting polymer precursor to increase absorption in the near-infrared portion of the spectrum without affecting the absorption of the thermosetting polymer precursor in the visible spectrum. Any light that is not absorbed by or reflected from the thermosetting polymer precursor may be absorbed by the substrate underneath it. In a preferred embodiment, a filter is inserted to remove all of the absorption of the flashlamp emission by the thermosetting polymer precursor, and absorption happens only immediately beneath the thermosetting polymer precursor.

Temperature Measurement

The temperature of the surface of thermosetting polymer precursor as well as into the depth of the thermosetting polymer precursor, its underlying substrate and any conductive cooling means, either from a block or roller, or/and convective means, such as an air knife, can be simulated with SimPulse® (available from PulseForge, Inc., Austin, TX). This simulation can be validated provided that bolometry (measurement of the radiant exposure in $J/cm^2$) of the pulses of light are measured as well as the temporal evolution of the radiant power from the flashlamp. Additional inputs to the simulation are the thermophysical properties of the stack including the absorption of the beam from the flashlamp, the heat capacity, the thermal conductivity, and thickness of each layer of the stack. Finally, the heat transfer coefficient and the temperature at the top and the bottom of the stack must be known. In this way, the heat input due to absorption of the pulse of light in the stack (it may be absorbed by a layer on top of the thermosetting polymer precursor, the thermosetting polymer precursor, the underlying substrate, the cooling chuck, or distributed between then) may be known. From this information, the peak temperature at any place into the depth of the stack, including the thermoset precursor film, can be determined as well as the average temperature of any place in the stack.

The surface of the thermosetting polymer precursor may be directly measured using a pyrometer. Since a pyrometer is generally only sensitive in the 10-micron range (10,000 nm), and the emission from the flashlamp is between 200 nm and 1,500 nm, the pyrometer is not sensitive to the emission from the flashlamp and can be used while the flashlamp is emitting light pulses. Additionally, a pyrometer also has a low frequency response and cannot resolve the rapid temperature increase of the thermoset due to absorption from the pulse of light from the flashlamp. Effectively, this means that a pyrometer measures the average temperature of the surface of the thermosetting polymer precursor during processing. For the present embodiment, the average thermosetting polymer precursor temperature does not exceed the average temperature limit of the thermoset precursor when the thermosetting polymer precursor is processed in an oven.

Theory of Thermosetting Polymer Curing Method

The following is the theory explaining why the above-mentioned thermosetting polymer curing method works. When the thermosetting polymer precursor is maintained at a higher temperature, the crosslinking reaction progresses much more rapidly. However, in the case of many thermosetting polymer precursors, such as polyimide, the curing is generally limited to a processing temperature of about 350° C. in an oven. At this temperature, the crosslinking, or in the case of PI, the imidization process takes about two hours and the resulting thermosetting polymer film can withstand about 400° C. without any damage after it is fully cured. This temperature limitation problem can be circumvented by cycling the temperature to far higher (as much as 550° C.) than the typical imidization temperature of 350° C. for a brief amount of time, followed by a rapid cooling to well below 350° C., and repeating it many times until the imidization reaction is complete. The average temperature during processing is maintained at below the maximum working temperature of the precursor. This is accomplished by using a rapidly pulsed broadband light source, such as a flashlamp combined with means to continuously cool the thermosetting polymer precursor during processing. Light from the flashlamp is absorbed by the thermosetting polymer precursor, the substrate below it, or an absorber on top of it. When the light is absorbed, the thermosetting polymer precursor is heated either directly or in combination via conduction from an absorber on top of or below the thermoset precursor. When the thermosetting polymer precursor is heated, the crosslinking reaction ensues. This generates gaseous products, but before the gaseous products can build up enough to damage the film, the film is rapidly cooled to a temperature lower than the maximum rated temperature of the thermosetting polymer precursor to allow for exhaustion of the gases. The average temperature of the thermosetting polymer precursor during processing can be monitored by a pyrometer.

In an exemplary case, there is little or no absorption of light pulses by a thermosetting polymer precursor film, but there is absorption directly below the thermosetting polymer precursor film. This may be accomplished by placing an optical filter in the path of light pulses to remove portions of the spectrum that would be absorbed by the thermosetting polymer precursor film. If the substrate below the thermosetting polymer precursor film is not absorptive of the light pulses, then an absorber (i.e., light-absorbing layer) may be placed there. When this happens, the curing of the thermosetting polymer precursor film progresses from the bottom of the thermosetting polymer precursor film up to the top surface. This is quite unusual when curing a thin film. Typically, the film is maintained at a constant temperature to crosslink it. As the thermosetting polymer precursor film crosslinks, volatiles are slowly released and diffuse to the boundary(s) of the film. One of the limiting factors of the prior art is that the temperature across the film is uniform, so the curing across the thickness of the thermosetting polymer precursor film is consequently uniform as well. Thus, as the crosslinking progresses, the film itself becomes more of a barrier to the release of the volatiles. This both increases the time to cure the thermosetting polymer precursor film and additionally limits the thickness of the thermosetting polymer precursor film that can be practically manufactured. In contrast, the short light pulses in the present embodiment insure that the temperature at the precursor-absorber interface is higher than any portion of the thermosetting polymer precursor film. Stated another way, the length of each light pulse is shorter than the thermal equilibration time across the thermosetting polymer precursor film. This creates a temperature gradient across the thermosetting polymer precursor film, which means that the crosslinking rate is highest at that interface and decreases as one progresses away from the interface. As the thermosetting polymer precursor film is being cured with subsequent light pulses, the crosslinking progresses from the precursor-absorber interface towards the top of the precursor film. A big advantage of the inventive method is that the volatile gas that is generated from the crosslinking reaction can easily escape to the top surface as that portion of the thermosetting polymer precursor film has not yet been cured to form a barrier to the volatile gas. In one sense, the curing method of the present invention is similar to how one would prefer a wound to cure: from the bottom up. This process can be called "zipper curing" because it is directional. Just like a wound, as the thickness of the thermosetting polymer precursor film becomes very thin (a few microns), the direction of the curing becomes less critical and consequently, the site of absorption, whether above, below or directly by the precursor of the beam, becomes less critical as well.

Figure 2:
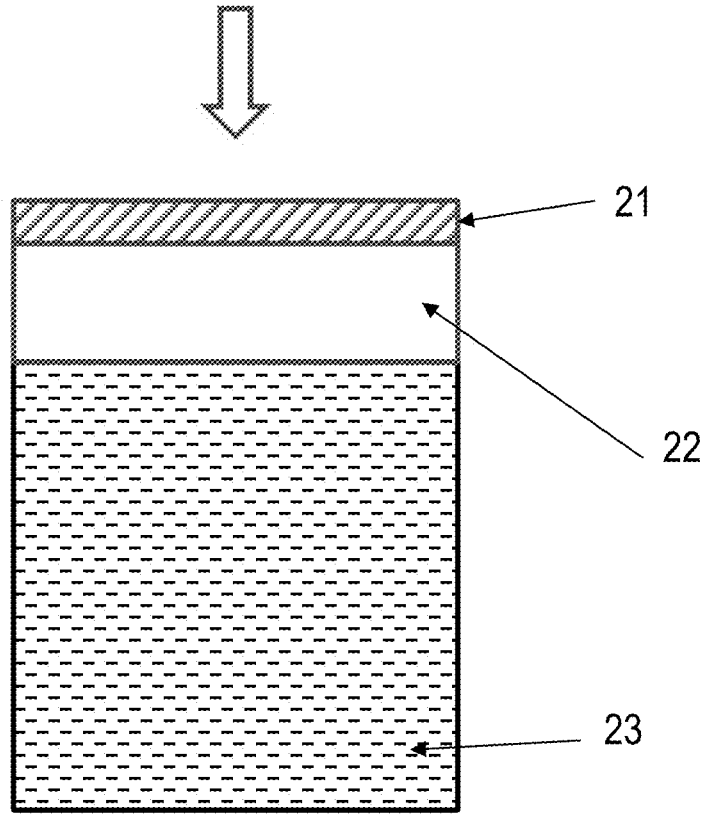
FIG. 2 shows an example of curing a thermosetting polymer on a silicon wafer, according to one embodiment.

Example 1: Curing of PI on Silicon Wafer [FIG. 2]

A PI precursor (PI-2525 polyamic acid manufactured by HD Microsystems) was deposited on a 6" diameter, 800 micron thick, silicon wafer 22 using a #10 Meyer Rod—(wet film thickness=25 micron), and dried for 20 minutes in an oven at 120° C. to form an approximately 15 micron thick (dry) PI precursor film 21. Wafer 22 was placed on a 6 mm thick graphite chuck 23 that was maintained at 130° C., and processed by a PulseForge Invent (model IX2-93-15, Pulse-Forge, Inc.) photonic curing tool using the following pulse profile: Voltage=380 V, pulse length=1 ms, pulse frequency=10 Hz, total exposure time=20 s. Radiant exposure of each pulse was 2.31 J/cm$^2$, and the total radiant exposure was 462 J/cm$^2$. Imidization of PI precursor film 21 was observed via the characteristic increase in darkness over PI precursor film 21. Optionally, an optical filter may be placed between the flashlamp head and PI precursor to eliminate any absorption by the PI precursor. By eliminating the absorption, the curing process can be even faster and without damaging the PI precursor film. Ideally, this would be a 500 nm long pass filter because typical PI precursors are relatively transparent above 500 nm. However, even eliminating the UV component of the light pulses would reduce the time needed for curing dramatically. This example was performed using silicon, but other semiconductors, such as gallium arsenide, can be utilized as well. Preferably, the PI layer should have a coefficient of thermal expansion (CTE) that is closely matched to the semiconductor, particular if it is employed as an interposer.

With this method, PI may also be cured on a low-temperature substrate, such as PET. Unlike the cases in which PI is cured on a high temperature substrate such as metal, silicon, glass, etc. PET has a maximum steady-state temperature rating of only 150° C. This is much lower than either PI or the PI precursor. The same method of this invention can be used to cure thin film PI on PET provided the maximum temperature on the surface of the PET does not exceed its maximum transient working temperature, which is approximately 400° C. In the example below, the backside of the PET substrate is thermally sunk to a relatively cooler, and thermally conductive thermal mass such that the backside of the PET does not exceed it maximum steady state working temperature, which is about 150° C. during processing. This insures dimensional stability of the PET substrate during processing. Additionally, and air knife is used to cool the top of the PI precursor and exhaust any gases from the imidization process.

A composite substrate comprised of a thin layer of a high temperature polymer, such as PI on top of a low temperature substrate, such as PET, forms a highly desirable structure that retains many of the positives of both a pure PI substrate and a pure PET substrate without having many of the negatives of each. Specifically, it has the superior chemical resistance, barrier, and adhesion properties of pure PI. Like a pure PET substrate, it retains much of the transparency of PET since the PI is so thin. Like a PET substrate, it is thermoformable. Like PET, it is inexpensive to produce as it is mostly PET. When photonically curing a film, such as a printed metal ink, on the composite substrate, higher temperatures can be achieved, and higher temperature materials can be processed on the composite substrate without damaging the film or the substrate over that of PET alone. The principal reason is that the Coefficient of Thermal Expansion (CTE) of the top layer of the composite film, i.e., PI, is much lower and better matched to many of the functional materials one desired to process on it, such as metals, ceramics, and semiconductors.

Figure 3:
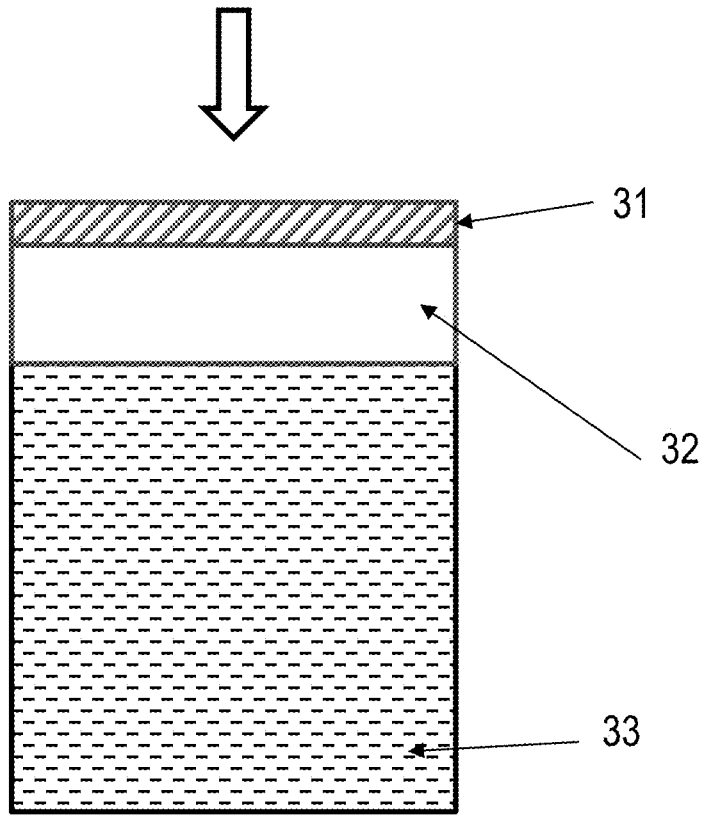
FIG. 3 shows in example of curing a thermosetting polymer on PET, according to one embodiment.

Example 2: Curing of PI on PET [FIG. 3]

A PI precursor (PI-2525 polyamic acid manufactured by HD Microsystems) was deposited onto ST505PET polyester (PET) film 32 (manufactured by DuPont, Inc.) using a #3 Meyer rod. Then, the sample was placed in an oven at 140° C. for 15 minutes to dry the PI precursor to form a PI precursor film 31 of approximately 4-5 microns thick. The sample was then placed on a 6 mm thick, room temperature, graphite vacuum chuck 33 maintained at 25° C. with PI precursor film 31 side up and exposed to a flashlamp (PulseForge #IX2-93-15) to imidize PI precursor film 31. The processing conditions were: 600 V, 120 us pulse length at 20 Hz for 30 seconds. The radiant exposure was 1.2 J/cm$^2$ per pulse for a total of 720 J/cm$^2$ radiant exposure. Full imidization was observed with no damage to either PI precursor film 31 or PET 32.

Figure 4:
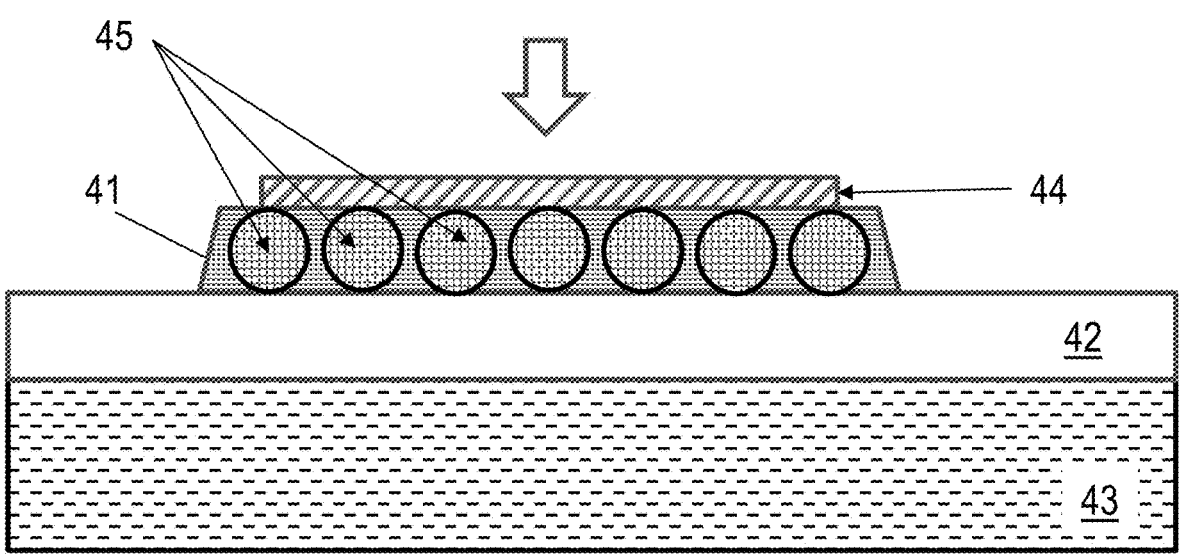
FIG. 4 shows an example of curing a thermosetting polymer underfill for flip chips, according to one embodiment.

Example 3: Curing of PI Underfill for Flip Chips [FIG. 4]

A semiconductor chip 44 was soldered on top of an FR4 interposer 42 via solder bumps 45. A low-viscosity PI precursor 41 was injected from the edge of the stack via a syringe to fill the voids between semiconductor chip 44, interposer 42 and solder bumps 45. The stack was then placed on a vacuum chuck 43 (FR4 side down) maintained at 120° C. PI precursor 41 was first dried using a flashlamp model #IX4-52-30 (PulseForge, Inc) from the side of semiconductor chip 44 (i.e., the top), which deposited a 1 J/cm$^2$, 300 V, 3,000 us long pulse lengths at 5 Hz over a 30 second period. The total radiant exposure during this time was 150 J/cm$^2$.

The dried PI precursor 41 was then cured using the same tool at 450 V, 1 ms pulse lengths at 20 Hz for 10 seconds. The total radiant exposure was 200 J/cm$^2$. The quality of the final underfill was checked by evaluating the cross-sectional SEM image to verify that it is void free.

Since semiconductor chip 44 was on top, during both the drying and the curing of PI precursor 41. The heating of PI precursor 41 was from absorption of the flashlamp light pulses by semiconductor chip 44 and subsequent thermal conductance to PI precursor 44.

A similar test was done with the same stack using an alternative underfill material, an epoxy (LOCTITE ECCO-BOND E 1172 A). It was syringe dispensed identically into the same structure as above and cured on vacuum chuck 43 maintained at 60° C. temperature with similar 1 J/cm² per pulse at 5 Hz over a 30 second period to set the final product. This alternative formulation did not require any drying and cured with a single curing step. The cure level of the final coating was checked through TGA analysis and show no weight loss below 250° C. which indicated the presence of no unreacted monomers, e.g., complete crosslinking.

Figure 5:
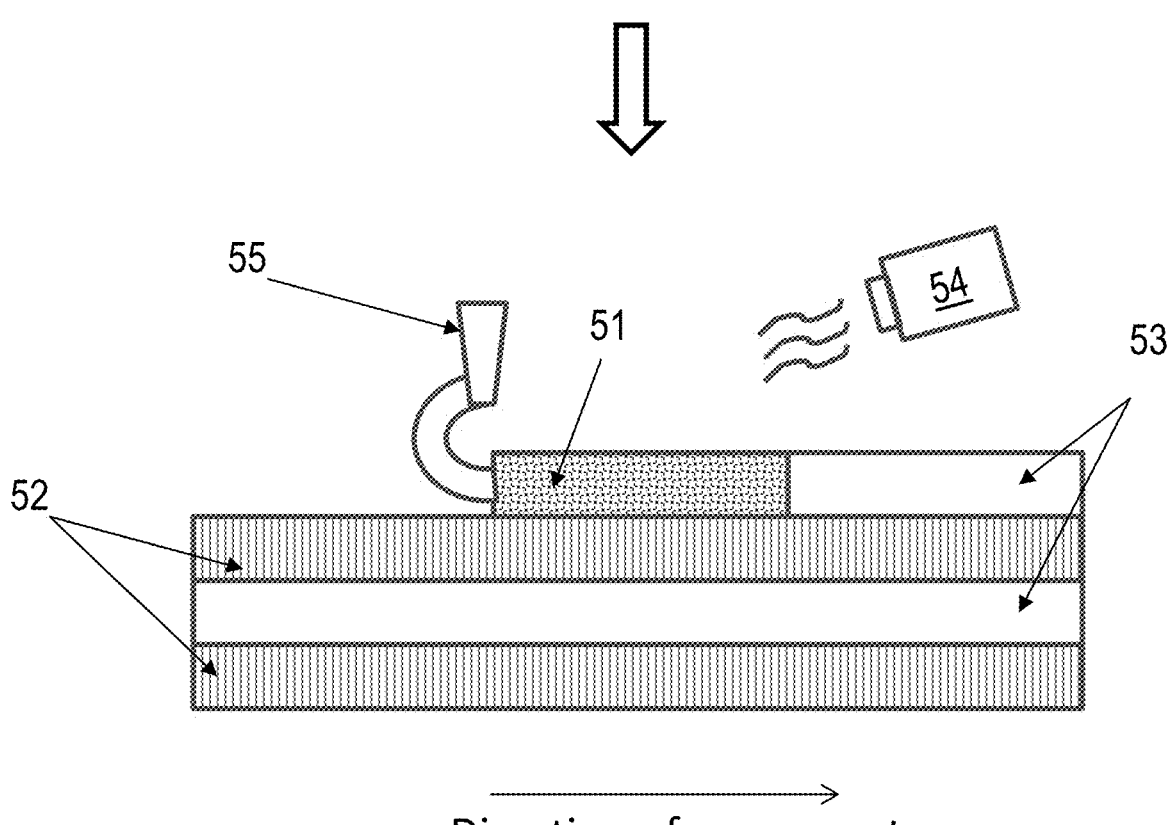
FIG. 5 shows an example of curing a thermosetting polymer on a copper clad laminate, according to one embodiment.

Example 4: Curing of PI on Copper Clad Laminate [FIG. 5]

UBE materials (UPIA-ST-1001), a polyimide precursor 51, was deposited in a roll-to-roll fashion on a flexible copper clad laminate (CCL). The flexible CCL consisted of two layers of copper 52 (17.5 μm thick) sandwiching a layer of cured polyimide 53 (75 μm thick). Deposition was done with a syringe pump system 55 running at 1 m/min. The coating resulted in a wet film thickness of around 30 μm and was heated using an near infrared heater in line with the printer resulting in a dry film thickness of around 20 μm. The carrier solvent was removed through the exhaust. The dried product was imidized on a 300 mm wide PulseForge tool model #IX4-52-30 with 800 us long pulses resulting in a radiant exposure of 1 J/cm² per pulse, flashing at 12 Hz at an overlap 50 resulting in a total radiant exposure of 50 J/cm². The substrate was suspended with tension between the idlers during processing to retain heat in the film due to absorption of light from the flashlamp. An air knife 54 was applied to the top of the film to cool the film and balance the heat input from the flashlamp during processing and act as an aid in solvent and gaseous byproduct removal. Imidization of the product was observed through near elimination of FTIR peak between 1,840 and 1,770 cm⁻¹ wave numbers, corresponding to a near elimination of most C=O variants in the coating.

A freestanding film of PI can be made by the same technique. The process may additionally be performed over a temperature-controlled roller that has the effect to both preheat and increase the cooling rate of the PI precursor after each pulse. An air knife may also be used to both cool the precursor and remove the solvent and volatile by-products of the imidization as well.

As has been described, the present invention provides a method for curing a thermosetting polymer precursor. Examples have included precursors such as polyamic acid to form a thin film PI or two-part epoxy resin to form thin-film epoxy. With the method of the present invention, a thermosetting polymer may be built up layer-by-layer to an arbitrary thickness. This method is not limited to the forming of thin-film polyimide or epoxy but thermosetting polymers in general including acrylics, polyesters, silicones, polyurethanes, phenolics, melamines, benzoxazines, bismaleimides, cyanate esters, thiolytes, vinyl esters, etc.

While the invention has been particularly shown and described with reference to a preferred embodiment, it will be understood by those skilled in the art that various changes in form and detail may be made therein without departing from the spirit and scope of the invention.

What is claimed is:

1. A method for curing thermosetting polymers, said method comprising:
   depositing a thermosetting polymer precursor on a substrate;
   pulsing light from a flashlamp to heat said thermosetting polymer precursor while simultaneously cooling said thermosetting polymer precursor in order to maintain an average temperature of said thermosetting polymer precursor at below its decomposition temperature;
   allowing a predetermined amount of time to lapse, after said exposing of said light pulse, to let any gaseous by-products to dissipate from said thermosetting polymer precursor; and
   repeating said pulsing and allowing steps until a thermosetting polymer thin film is formed.

2. The method of claim 1, wherein said depositing further includes depositing said thermosetting polymer precursor on said substrate in liquid form.

3. The method of claim 2, wherein said method further includes removing fluid from said thermosetting polymer precursor.

4. The method of claim 3, wherein said removing is performed by the flashlamp.

5. The method of claim 3, wherein said removing is performed by an oven.

6. The method of claim 1, wherein said method further includes filtering light pulses from said flashlamp to remove bands light that are absorbed by said thermosetting polymer precursor.

7. The method of claim 1, wherein said thermosetting polymer precursor is polyamic acid.

8. The method of claim 1, wherein said thermosetting polymer precursor is epoxy.

9. The method of claim 1, wherein said substrate is made of semiconductor.

10. The method of claim 1, wherein said substrate is made of polymer.

11. The method of claim 1, wherein said substrate is made of metal.

12. The method of claim 1, wherein said substrate is made of glass.

13. The method of claim 1, wherein said cooling is performed by a temperature-controlled heat sink.

14. The method of claim 1, wherein said cooling is performed by an air knife.

15. The method of claim 1, wherein said thermosetting polymer precursor along with said substrate are conveyed relative to said flashlamp when said thermosetting polymer precursor is being cured.

16. The method of claim 1, wherein said method further includes preheating said thermosetting polymer precursor before said pulsing step.

* * * * *